United States Patent [19]
Takagi et al.

[11] Patent Number: 5,608,486
[45] Date of Patent: Mar. 4, 1997

[54] LENS-FITTED PHOTOGRAPHIC FILM PACKAGE

[75] Inventors: Junichi Takagi; Seiji Asano, both of Kanagawa, Japan

[73] Assignee: Fuji Photo Film Co., Ltd., Kanagawa, Japan

[21] Appl. No.: 202,496

[22] Filed: Feb. 28, 1994

[30]     Foreign Application Priority Data

Mar. 3, 1993  [JP]  Japan .................................... 5-042877
Mar. 3, 1993  [JP]  Japan .................................... 5-042878
Mar. 6, 1993  [JP]  Japan .................................... 5-071195

[51] Int. Cl.$^6$ ............................. G03B 17/00; G03B 15/03
[52] U.S. Cl. ............................. 396/6; 396/448; 396/529; 396/176
[58] Field of Search .................................... 354/288, 286, 354/149.11, 219, 485

[56]             References Cited

U.S. PATENT DOCUMENTS 4,884,087  11/1989  Mochida et al. .
4,896,178   1/1990  Ohmura et al. ........................ 354/145.1
5,235,364   8/1993  Ohmura et al. .
5,329,330   7/1994  Sakai et al. .
5,337,099   8/1994  Tasaka et al. .
5,400,098   3/1995  Rydelek .
5,436,685   7/1995  Yamashima ............................. 354/202

FOREIGN PATENT DOCUMENTS 3-114829  11/1991  Japan .
5-19419    1/1993  Japan .
5-45802    2/1993  Japan .

Primary Examiner—Safet Metjahic
Assistant Examiner—Daniel Chapik
Attorney, Agent, or Firm—Young & Thompson

[57]              ABSTRACT

A lens-fitted photographic film package with a flash unit and a viewfinder optical system, which is thin and contributes to effective and economical automatic recycling operations. The taking lens system of the film package is accommodated in a lens holder incorporated in a photo-taking unit having photo-taking mechanisms, and is held immovably in the lens holder by a lens cover removably fitted on the lens holder by snap-in engagement. The viewfinder optical system is also incorporated in the photo-taking unit. The photo-taking unit is removably attached to a main body of the film package, and the flash unit is removably attached to the main body with its printed circuit board disposed between the photo-taking unit and a front surface of a film supply chamber. A light emitting portion of the flash unit is secured to a lateral side of the printed circuit board, so as to be disposed above the film supply chamber. A metal blade constituting a flash charging switch is removably attached to the outside of the film supply chamber. A front cover is removably attached to the main body so as to cover the front and top of the main body, the photo-taking unit and the flash unit.

8 Claims, 10 Drawing Sheets

LENS-FITTED PHOTOGRAPHIC FILM PACKAGE

BACKGROUND OF THE INVENTION

1. Field of the Invention

The present invention relates to a lens-fitted photographic film package and more particularly to a lens-fitted photographic film package which is improved as to its suitability for the operations of disassembling, inspecting and reassembling the reusable parts of the package. The present invention also relates to a lens-fitted photographic film package with a built-in flash unit, which is improved as to its compactness.

2. Related Art

Lens-fitted photographic film packages (hereinafter simply referred to as film packages) are well known, having a simple photograph-taking mechanism as disclosed in U.S. Pat. No. 4,884,087. Such film packages can be purchased nearly everywhere at low prices, making it possible to take photographs anywhere without carrying about heavy and expensive cameras.

Such a film package has a film housing equipped with a taking lens and containing a 135-type photographic film cassette that has been drawn out of the photographic film cassette and wound in a roll.

A film package with a built-in flash unit is also well-known in the art. FIG. 10 of the accompanying drawings shows a film housing 90 of such a conventional film package having a built-in flash unit 91. The flash unit 91 is attached to a main body 92 on the same side as a film supply chamber 93 containing a film roll drawn out from a film cassette 94. A photograph-taking unit 95 including a taking lens, a shutter mechanism and a film advance stop mechanism for advancing the film one frame at a time, is also attached to the main body 92 at the front middle portion thereof. Thereafter, a front cover 96 is attached to the main body 92 to cover the front and top sides of the main body 92. A rear cover 98 is attached to the rear side of the main body 92 so as to close the film supply chamber 93 and a film take-up chamber 97 to contain the film roll and the film cassette 94 in a light-tight fashion. The flash unit 91 consists of a light emitting portion 100, an electric circuit including a capacitor 101, and a printed circuit board 102 on which the light emitting portion 100 and the electric circuit are mounted.

The printed circuit board 102 is secured to the main body 92 through engagement between a hole 102a through the board 102 and a hook 92a on the main body 92. The light emitting portion 100 and the capacitor 101 are disposed above the film supply chamber 93. A flash charging switch 103 is integrally formed with the front cover 96, and a metal contact blade 104 is mounted on the back of the flash charging switch 103. When the switch 103 is depressed, a pair of conductive surfaces 105 formed on the printed circuit board 102 are connected to each other through the contact blade 104, to charge the capacitor 101. The capacitor 101 is discharged to cause the light emitting portion 100 to emit a flash of light in response to a shutter release operation.

Because the film package cannot be repeatedly loaded with film, after the exposure of all the available frames of the contained film, the whole film package is forwarded to a photofinisher. The photofinisher removes the exposed film from the film housing and subjects it to a photographic printing process, in the same manner as other 135-type films. The obtained photoprints and the developed film are returned to the customer.

The thickness of the film unit is only slightly greater than the diameter of the photographic film cassette, so as to render the film package more readily portable. However, there have been carried out studies to make the size of compact cameras approach the size of a credit card or a cigarette case. In this connection, it is desired to further miniaturize the film package whilst still using a 135-type photographic film cassette.

There is disclosed a much more compact film package with a 135-type photographic film cassette and a built-in flash unit in U.S. patent application Ser. No. 07/928,703. In this film package, a portion of the front cover has a curve complementary to the front outside surface of the film take-up chamber containing the film cassette thereby to serve as a grip, while the other portion of the front cover is made flat and disposed rearward relative to the grip portion by forming the film supply chamber smaller in diameter than the film take-up chamber. However, if the flash unit is disposed in front of the film supply chamber, it is difficult to remarkably reduce the thickness of a film package with such a flash unit.

Meanwhile, in the interest of environmental protection or the reduction of industrial waste, the modern trend in industry is toward recycling. For this purpose, and also to save money, the used film packages are recovered from the photofinishers, and disassembled and inspected by the manufacturer, and reused in new film packages or melted for use as raw materials. To this end, film packages suitable for reuse have recently been proposed. For example, a film package having a photograph-taking unit which is adapted to be reused in a new film package, is disclosed in U.S. patent application Ser. No. 07/913,435.

In this earlier film package, a cylindrical lens holder for holding the taking lens elements is formed on a front portion of the photo-taking unit, and the lens elements inserted in the lens holder are fixedly held between the lens holder and the front cover when the front cover is attached to the main body. When disassembling the above film package for reuse of the photo-taking unit, the taking lens elements tend to drop out of the lens holder after the front cover is detached from the main body. Therefore, this film package is unsuitable for automatic disassembling and reassembling operations.

Moreover, although the photo-taking unit disclosed in the last mentioned U.S. application makes it possible to test the performance of the mechanism of the unit independently from other parts without the need for mounting the unit on the main body, it is nevertheless impossible to check the transparency, the eccentricity and other properties of the taking lens system of this unit unless the unit is mounted on the main body and covered by the front cover. Therefore, the known photo-taking unit needs a large and complicated lens inspection system.

Meanwhile, film packages with a viewfinder optical system are also known, for example from Japanese Laid-open Utility Model Application No. 3-114829. The viewfinder optical system disclosed in this application is held in a lens barrel which is secured to the main body. In another type of such film package, the viewfinder optical system is disposed in a lens holding recess which is formed integrally with the top wall of the front cover, and a pressing plate is removably fitted over the recess to hold the viewfinder optical system immovable therein.

Although the film housing is encased in an outer casing from the time of shipment from the factory until the time of processing the exposed film, the front cover is partly exposed to the outside, i.e., in the region of the shutter button, the lens hood and so forth. Therefore, these exposed portions of the front cover may often be stained or scratched, so that the front covers of the recovered film packages are mostly melted to be recycled as raw material. In the case of a front cover having a viewfinder optical system mounted therein, it is necessary, before melting the front cover, to remove the pressing plate and the viewfinder optical system therefrom. But this increases the number of operations necessary for recycling the film packages.

OBJECTS OF THE INVENTION

In view of the foregoing, an object of the present invention is to provide a film package which is suitable for automatic disassembling, inspecting and reassembling processes.

Another object of the present invention is to miniaturize a film package with flash unit.

SUMMARY OF THE INVENTION

To achieve the above objects, the present invention provides a lens cover which is removably fitted on a lens holder by snap-in engagement to hold a taking lens system immovably in the lens holder. The lens holder is incorporated in a photograph-taking unit. Thereby, the taking lens system is prevented from dropping out of the lens holder when the photograph-taking unit is removed from a main body.

A printed circuit board of a flash unit is disposed between the photograph-taking unit and a front surface of a film supply chamber of the main body so as not to protrude relative to the front surface. A light emitting portion of the flash unit is secured to a lateral side of the printed circuit board so as to be disposed above the film supply chamber. A metal blade for use as a flash charge switch is removably attached to the main body. Thanks to this construction, the thickness of the film package can be reduced to the minimum on the same side of the package as the film supply chamber.

A viewfinder optical system is incorporated in the photograph-taking unit. A finder lens frame having vertical channels is integrally formed on an upper portion of a base of the photograph-taking unit, and the viewfinder optical system is inserted from the top of the finder lens frame along these channels. Since the front cover has no attachment, the front cover can be smashed and melted directly after removal from the main body.

BRIEF DESCRIPTION OF THE DRAWINGS

Other objects and advantages of the present invention will become apparent from the following detailed description of the preferred embodiments when read in connection with the accompanying drawings, wherein like reference numerals designate like or corresponding parts throughout the several views, and wherein.

DETAILED DESCRIPTION OF THE PREFERRED EMBODIMENT

Figure 1:
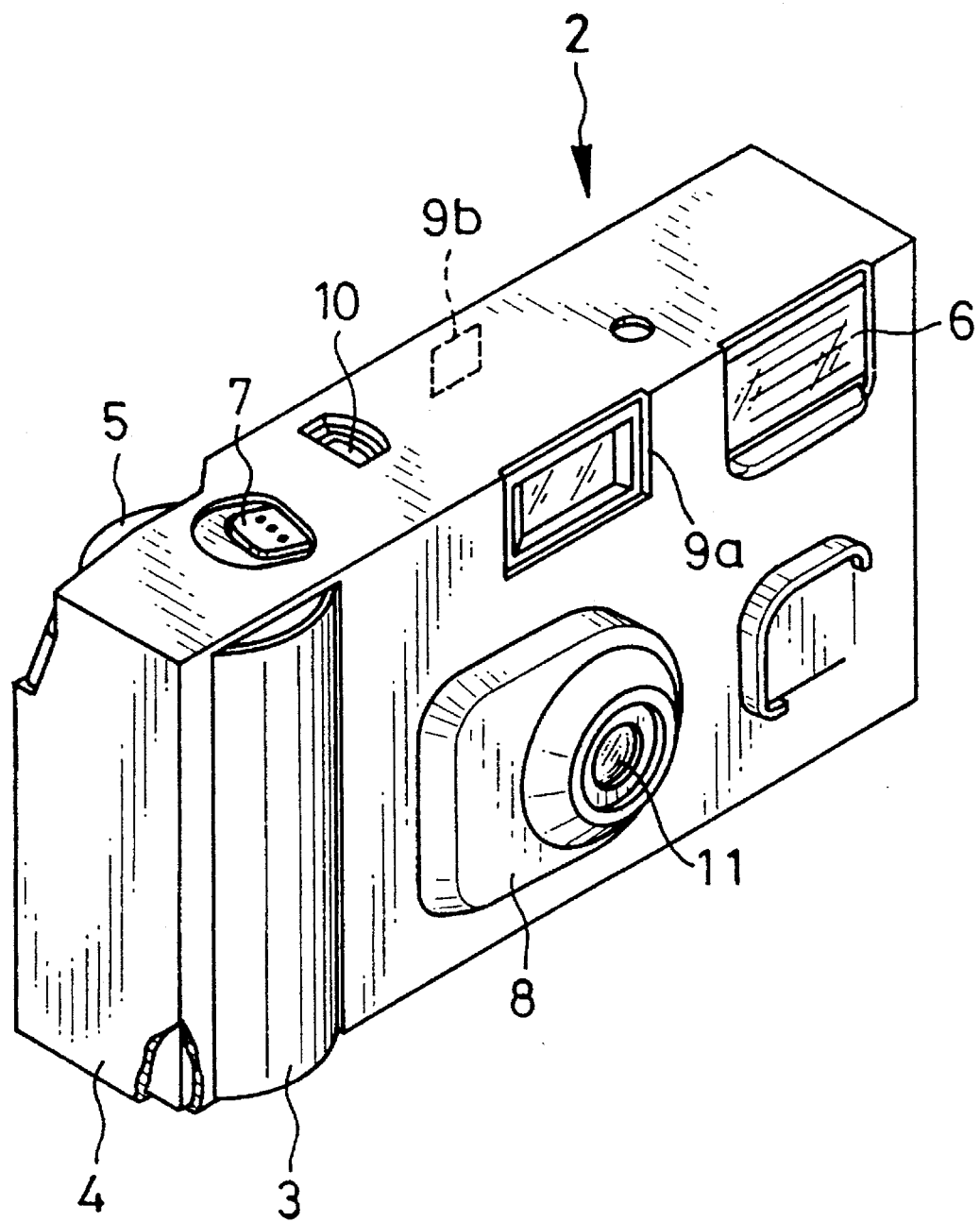
FIG. 1 is a perspective view of a film package according to a preferred embodiment of the present invention.

Referring to FIG. 1, a film package 2 is compactly formed to have a small thickness and consists of a film housing 3 and an outer casing 4 encasing the film housing 3 therein. The outer casing 4 has openings for exposing a film advancing wheel 5, a light emitting portion 6, a shutter release button 7, a lens hood 8, a front viewfinder window 9a, a rear viewfinder window 9b and a frame counter disk 10 and the like. The film housing 3 has a simple photo-taking mechanism including a taking lens system 11.

Figure 2:
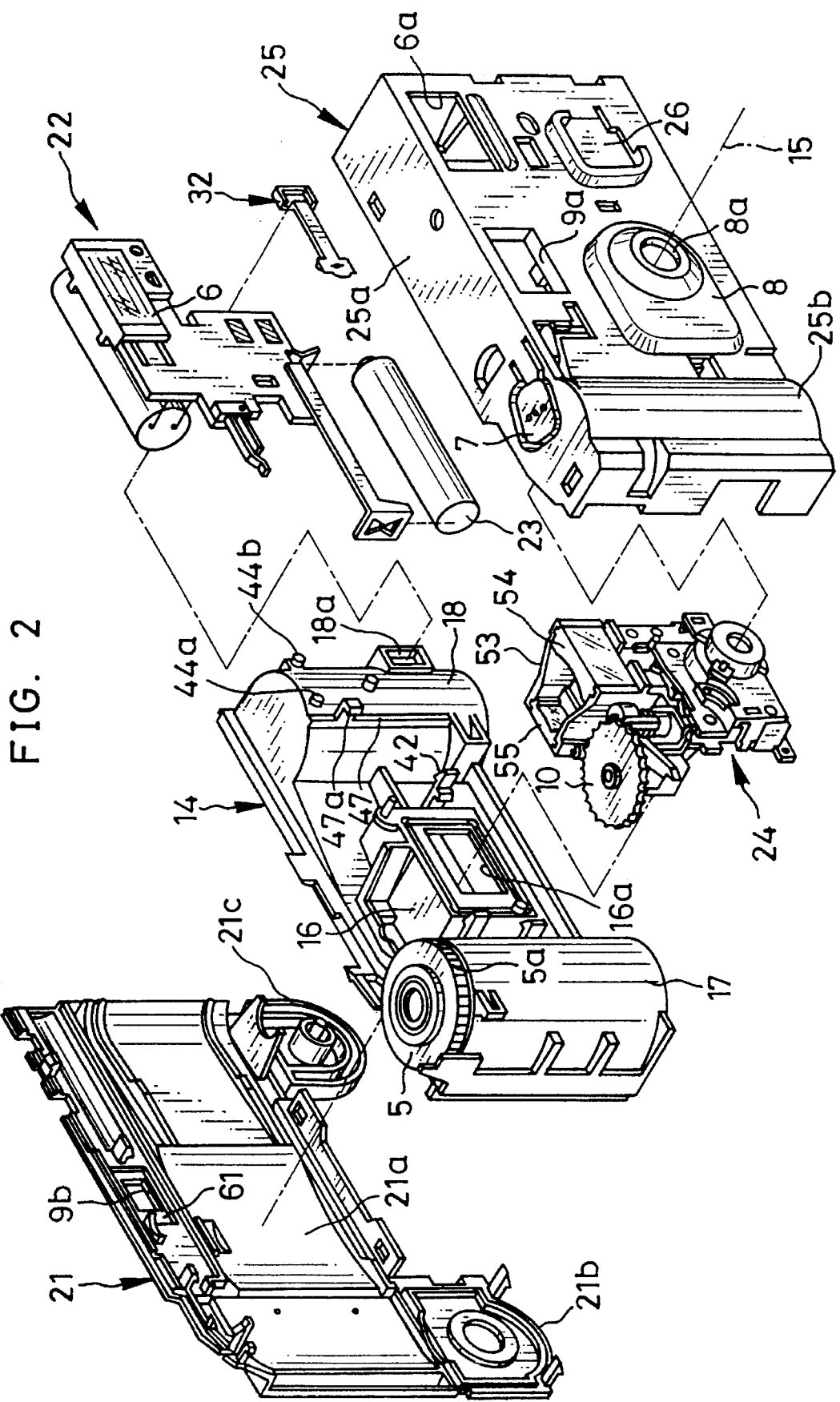
FIG. 2 is an exploded perspective view of the film housing of the film package of FIG. 1.

In FIG. 2 illustrating the film housing 3, a main body 14 has an exposure chamber 16 having a front opening 16a and a rear opening or exposure aperture 16b (see FIG. 7) disposed coaxially with the optical axis 15 of the taking lens system 11, a film take-up chamber 17 and a film supply chamber 18 disposed on opposite horizontal sides of the exposure chamber 16. The main body 14 is configured such that the front outside surface of the film take-up chamber 17 protrudes forward as compared with the front outside surface of the film supply chamber 18.

Figure 3:
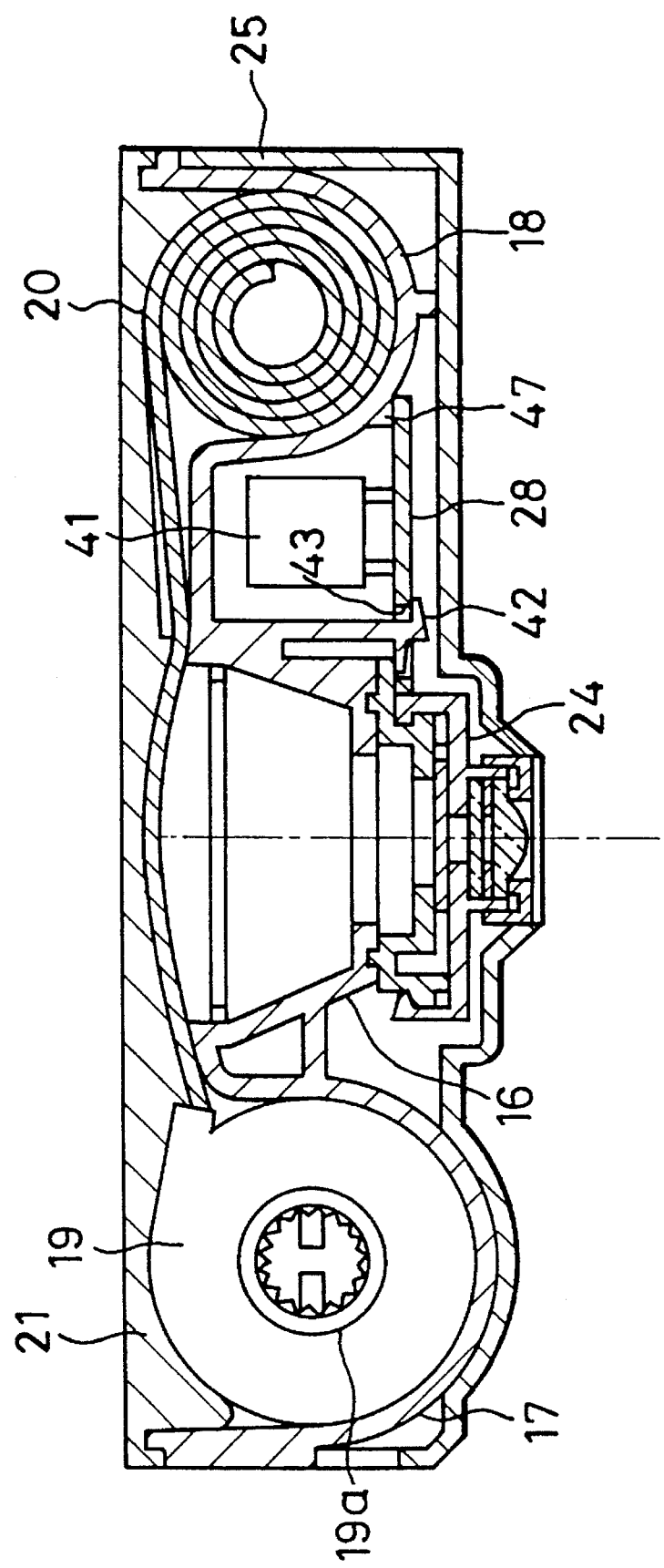
FIG. 3 is a horizontal section of the film housing of the film package of FIG. 1.

In assembled condition, a 135-type photographic film cassette 19 is contained in the film take-up chamber 17 and a photographic film 20 which has been drawn out of the photographic film cassette 19 and wound in a roll is contained in the film supply chamber 18, as is shown in FIG. 3. Thereafter, the main body 14 is closed by a rear cover 21 in a light-tight manner. As shown in FIG. 3, the diameter of the film take-up chamber 17 is approximately equal to that of a photographic film cassette conforming to the ISO 135 version and the diameter of the film supply chamber 18 is smaller than that of the film take-up chamber 17. The roll of photographic film 20 can be contained in the film supply chamber 18 by winding the photographic film 20 tightly and omitting a core such as a spool.

On the film take-up chamber 17, the film advancing wheel 5 engages a spool 19a of the photographic film cassette 19 to rotate the spool 19a to rewind the exposed film by one frame back into the cassette 19 after each exposure. The rear cover 21 has a film supporting surface 21a disposed behind the exposure chamber 16, and two lids 21b and 21c disposed on the bottoms of the film take-up and supply chambers 17 and 18, respectively. The lid 21b is opened to take out the photographic film cassette 19 containing the completely exposed film 20. The film advancing wheel 5 has teeth 5a of constant pitch.

A flash unit 22 including the light emitting portion 6 and equipped with a battery 23, as well as a photo-taking unit 24 including the frame counter disk 10 are removably attached to the front of the main body 14 through snap-in engagement. Thereafter, a front cover 25 is attached to the front of the main body 14 to cover these units. Also the rear and front covers 21 and 25 are removably attached to the main body 14 through snap-in engagement.

The front cover 25 includes the viewfinder front window 9a, the lens hood 8 with a taking lens opening 8a, a flash window 6a corresponding to the light emitting portion 6, a flash charging switch 26 and so forth formed in the front thereof, and has a shutter button 7 and an opening for the frame counter disk 10 and so forth formed in the top wall 25a thereof. The front cover 25 is integrally formed as one body. A portion of the front cover 25 disposed in front of the film take-up chamber 17 protrudes forward along the outline of the front surface of the film take-up chamber 17 to provide a grip portion 25b.

Figure 4:
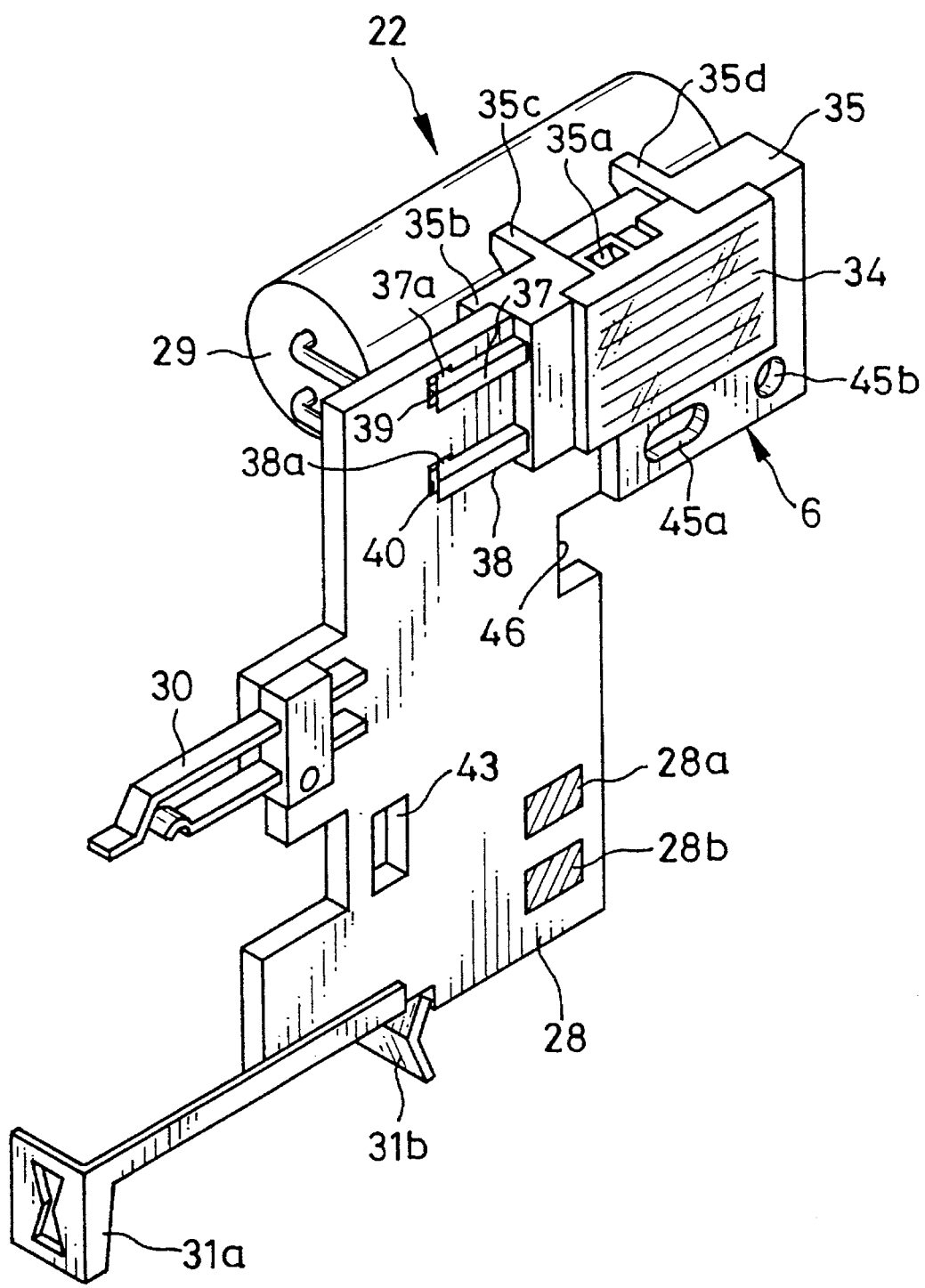
FIG. 4 is an enlarged perspective view of the flash unit mounted in the film package of FIG. 1.

As shown in FIG. 4, the flash unit 22 consists of the light emitting portion 6 and a printed circuit board 28. On the printed circuit board 28 are mounted electric elements such as a capacitor 29, a flash trigger switch 30 which is turned on upon depressing the shutter button 7, and a pair of contacts 31a and 31b for connecting the battery 23. A metal contact blade 32, which is actuated by the flash charging switch 26 to connect conductive surfaces 28a and 28b formed on the printed circuit board 28, is secured at one end in a cavity 18a formed integrally with the main body 14 on the front outer surface of the film supply chamber 18.

The light emitting portion 6 is constituted of a diffusion plate 34, a not-shown discharge tube, a not-shown reflector, and a plastic frame 35 holding these elements. The discharge tube and the reflector are held in the interior of the frame 35, and the diffusion plate 34 is attached to the front of the frame 35 through engagement with a claw 35a of the frame 35. The light emitting portion 6 is attached to the printed circuit board 28 such that the printed circuit board 28 is nipped between a projection 35b and arms 37 and 38 which are integrally formed on one side of the frame 35, while hooks 37a and 38a formed on the tips of the arms 37 and 38 engage in holes 39 and 40 formed in the printed circuit board 28. In this way, the light emitting portion 6 protrudes sideways from the printed circuit board 28. Projections 35c and 35d formed on upper portions of the frame 35 hold the capacitor 29 on the rear of the light emitting portion 6.

As shown in FIG. 3, the printed circuit board 28 is disposed between the film supply chamber 18 and the exposure chamber 16 and is rearward of the forwardmost surface of the film supply chamber 18. Electric elements 41 are mounted on the rear surface of the printed circuit board 28, so as to be disposed in a space between the film supply chamber 18 and the exposure chamber 16. To attach the flash unit 22 to the main body 14, a hook 42 is integrally formed on the main body 14 and engages in a hole 43 through the printed circuit board 28. Also pins 44a and 44b (FIG. 2) are formed on the front outer surface of the film supply chamber 18 so as to engage in a slot 45a and a hole 45b, respectively, in frame 35 (FIG. 4).

In this way, one side edge of the printed circuit board 28 having a cutout 46 therein can be brought into tight contact with a ridge 47 formed vertically on the outer surface of the film supply chamber 18, while a hook 47a (FIG. 2) engages with the cutout 46. The capacitor 29, which is the largest electric element of the flash unit 22, is disposed behind the light emitting portion 6 and is received in a space above the film supply chamber 18. In this way, the flash unit 22 has hardly any influence on the thickness of the film housing 3. It is to be noted that the grip portion on the side of the film take-up chamber 17 may be formed by a rearward projection instead of the forward projection 25b.

Figure 5:
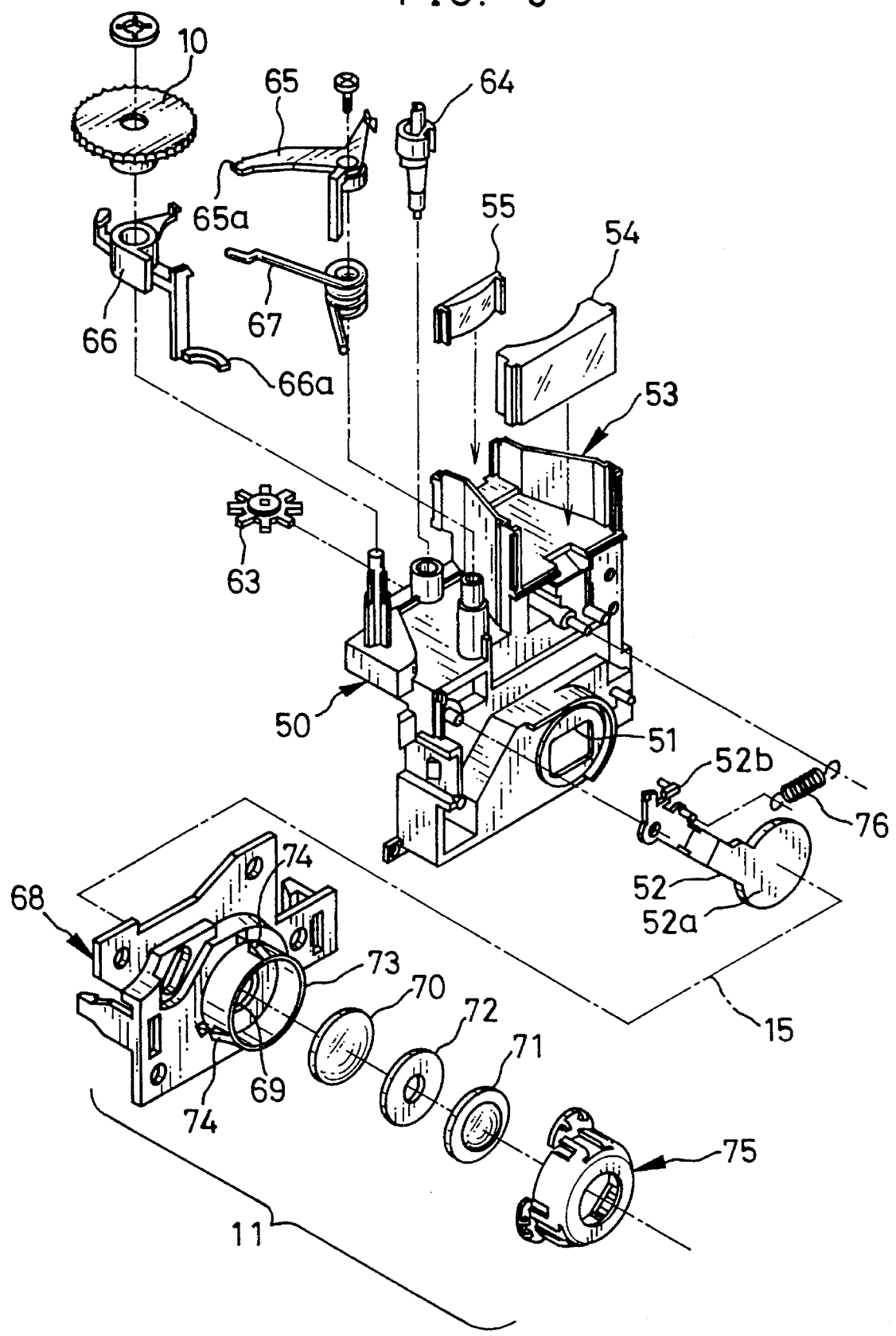
FIG. 5 is an exploded perspective view of the phototaking unit mounted in the film package of FIG. 1.

Referring to FIG. 5 illustrating the photo-taking unit 24, a base section 50 of the unit 24 has a shutter opening 51 and a viewfinder frame portion 53 integrally formed from plastic material or the like. A shutter blade 52 is pivotally mounted in front of the shutter opening 51. The viewfinder frame portion 53 is of U-shape with its top, front and rear open so as to receive an objective lens 54 and an eyepiece 55 from the top into the respective front and rear ends thereof. The lenses 54 and 55 constitute an inverted Galilean viewfinder optical system. The photo-taking unit 24 is removably attached to the front of the exposure chamber while the viewfinder frame portion 53 is disposed above the exposure chamber 16.

Figure 6:
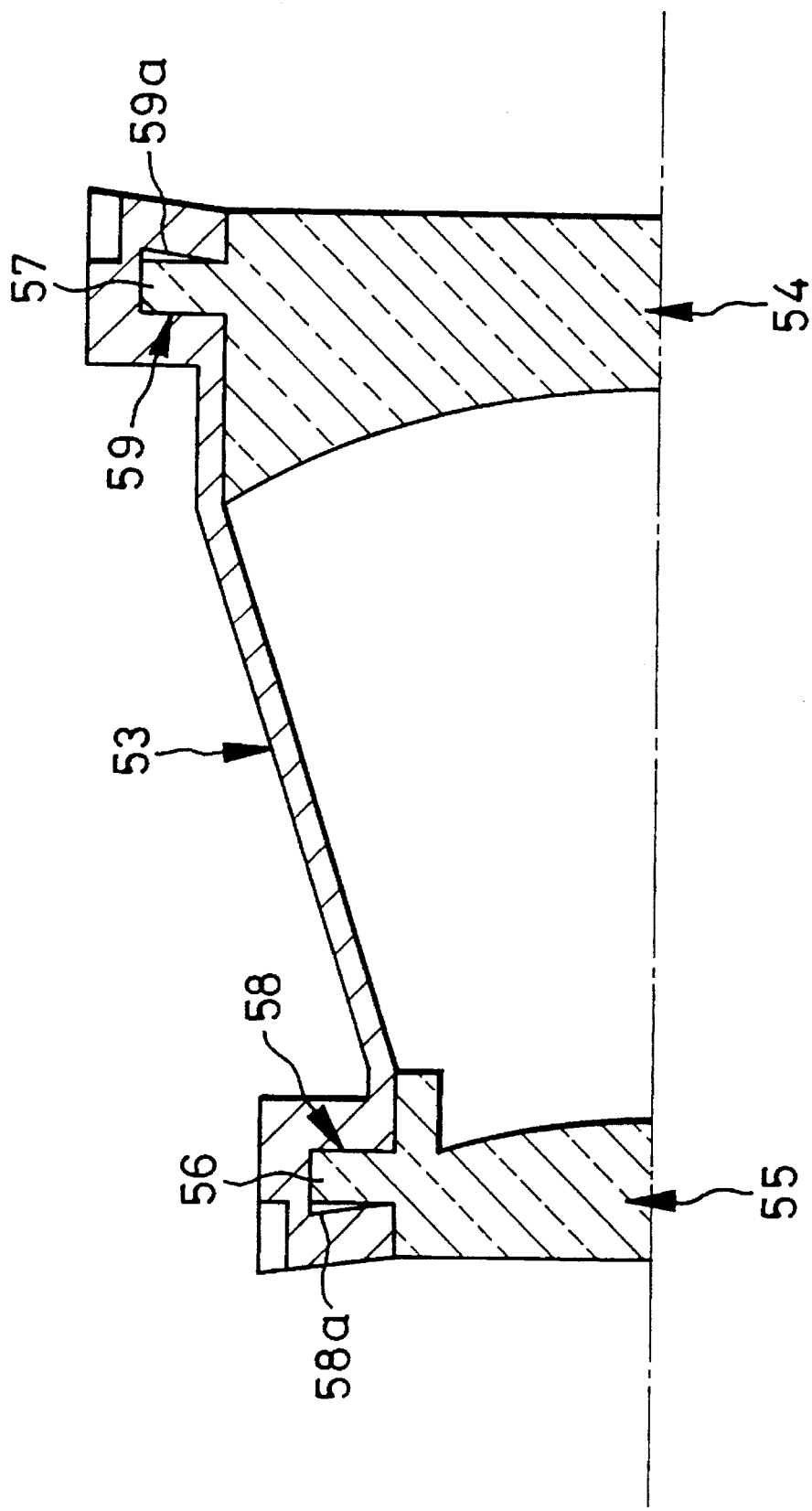
FIG. 6 is a fragmentary horizontal section of the viewfinder optical system of the film package of FIG. 1.

FIG. 6 shows an enlarged horizontal section of the essential parts of the viewfinder optical system. The objective lens 54 and the eyepiece 55 have respective ridges 57 and 56 integrally formed therewith on opposite lateral sides thereof. The ridges 56 and 57 are fitted in vertical grooves or channels 58 and 59 which are integrally formed with the viewfinder frame portion 53. Side walls 58a and 59a of these channels 58 and 59, which are disposed on opposite axial ends of the viewfinder optical system, converge inwardly toward the opposite side walls with respect to the axial direction so as to make the openings of the channels 58 and 59 slightly narrower than the width of the ridges 56 and 57. The base portions of the side walls 58a and 59a are thinned by cutouts so as to permit the side walls 58a and 59a to be resiliently bent to widen the channels 58 and 59 and to pinch the ridges 56 and 57 in the channels 58 and 59 by virtue of the resiliency of the side walls 58a and 59a.

Figure 7:
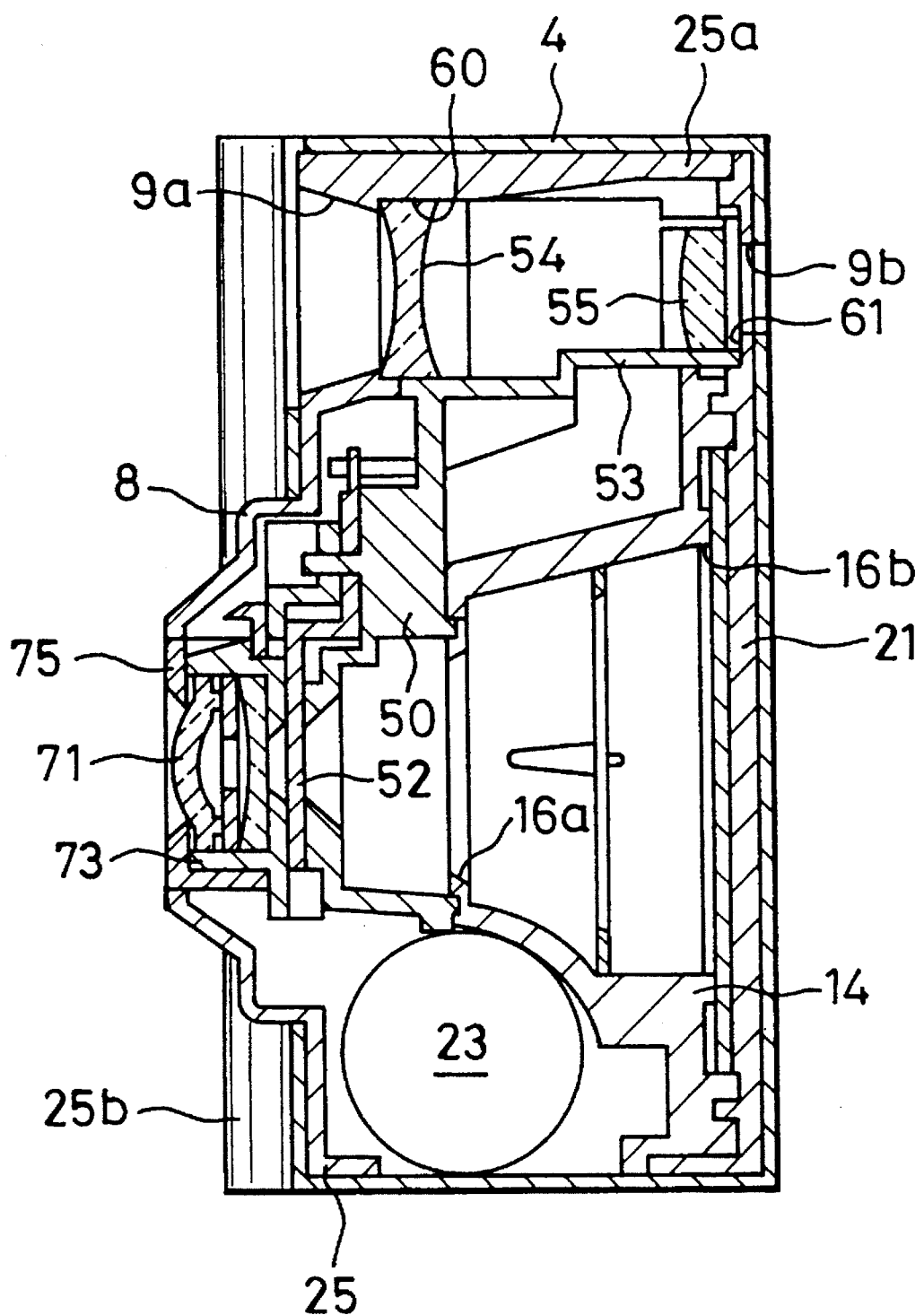
FIG. 7 is a vertical section of the film package of FIG. 1.

As shown in FIG. 7, the top wall 25a of the front cover 25 closes the open top of the viewfinder frame portion 53 when front cover 25 is attached to the main body 14. The top wall 25a has a pair of ribs 60 formed inside thereof integrally therewith, which extend in the axial direction of the viewfinder optical system so as to contact the top edge of the objective lens 54 and hold the lens 54 immovable. Also the rear cover 21 has an inside recess 61 surrounding the viewfinder rear window 9b (see FIG. 2), such that the viewfinder frame portion 53 is fitted in the recess 61 at the eyepiece side, thereby to hold the eyepiece 55 immovable. Accordingly, there is no need for a plate member or the like which is conventionally necessary for holding the viewfinder optical system on a photo-taking unit. Therefore, the number of parts and assembling procedures is reduced. It may be possible to elongate the ribs 60 to hold the eyepiece 55 as well as the objective lens 54.

On the base portion 50 of the photo-taking unit 24, there are mounted a sprocket wheel 63 (FIG. 5) to engage in perforations of the photographic film 20, a shutter cocking cam 64, an arresting lever 65, a shutter actuating lever 66 and a drive spring 67 besides the frame counter disk 10 and the shutter blade 52, which together constitute a shutter mechanism and a film advance stop mechanism. The shutter blade 52 is crank-shaped when viewed from the side so as to minimize the thickness of the film package 2. Thereby, an end portion 52a of the shutter blade 52 swings in a first plane perpendicular to the optical axis 15 of the taking lens 11 in front of the shutter opening 51, while the other end portion 52b of the shutter blade that is struck by the shutter actuating lever swings in a second plane perpendicular to the optical axis 15 but spaced from the first plane. The shutter mechanism and the film advance mechanism shown in FIG. 5 are similar to those disclosed in U.S. patent application Ser. No. 08/062,185, so that the detailed description of these mechanisms is omitted.

In front of the shutter blade 52 is attached a shutter cover 68 having a stop aperture 69. Two lens elements 70 and 71 and a spacer 72 inserted therebetween are held in a cylindrical lens holder 73 formed integrally with the shutter cover 68 and coaxially with the stop aperture 69. The lens holder 73 has three engaging claws 74 formed around the periphery at intervals of 120 degrees. By fitting a lens cover 75 on the lens holder 73 and securing it with the engaging claws 74, the assembly of the photo-taking unit 24 is complete.

A spring 76 is provided for biasing the shutter blade 52 toward the closed position.

Figure 8:
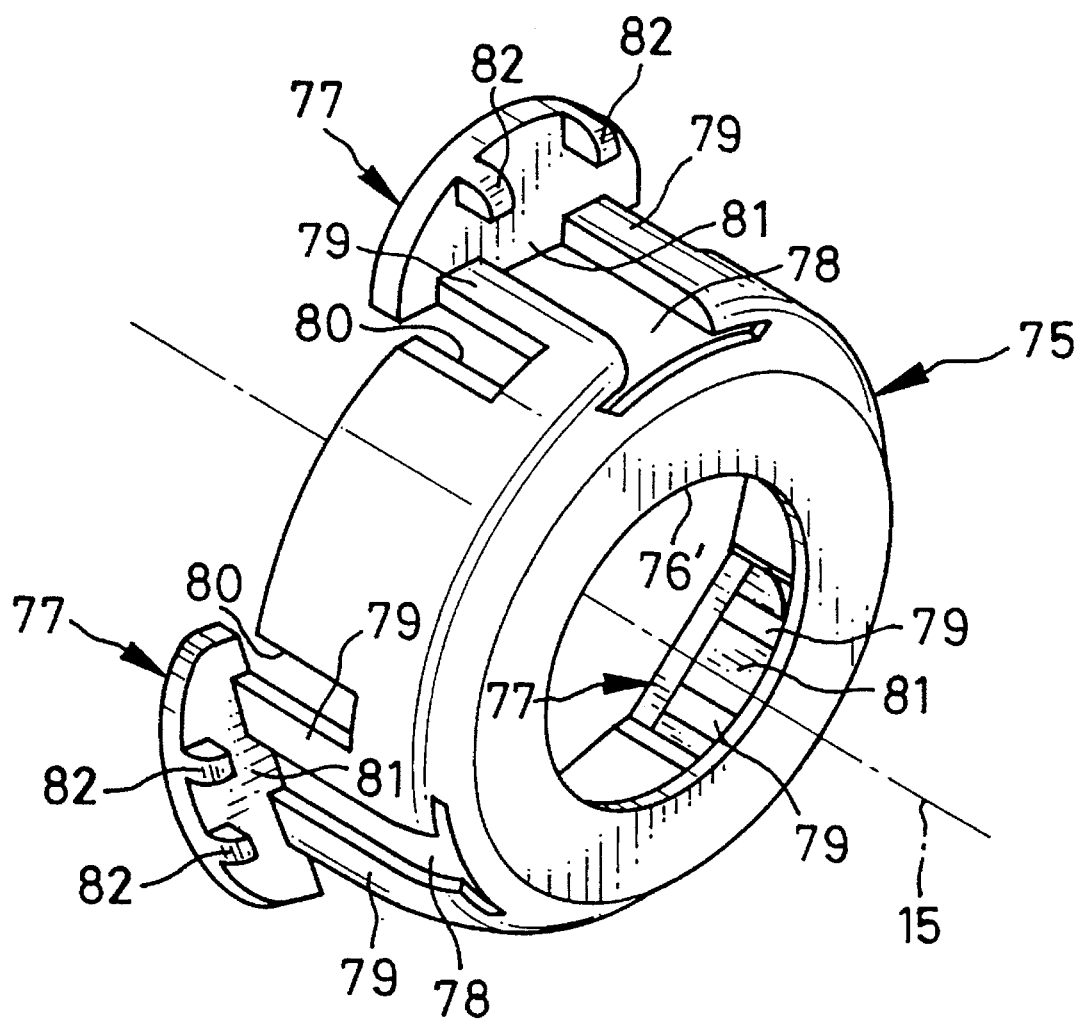
FIG. 8 is an enlarged perspective view of the lens cover for holding the taking lens elements on the photo-taking unit of FIG. 5.
Figure 9:
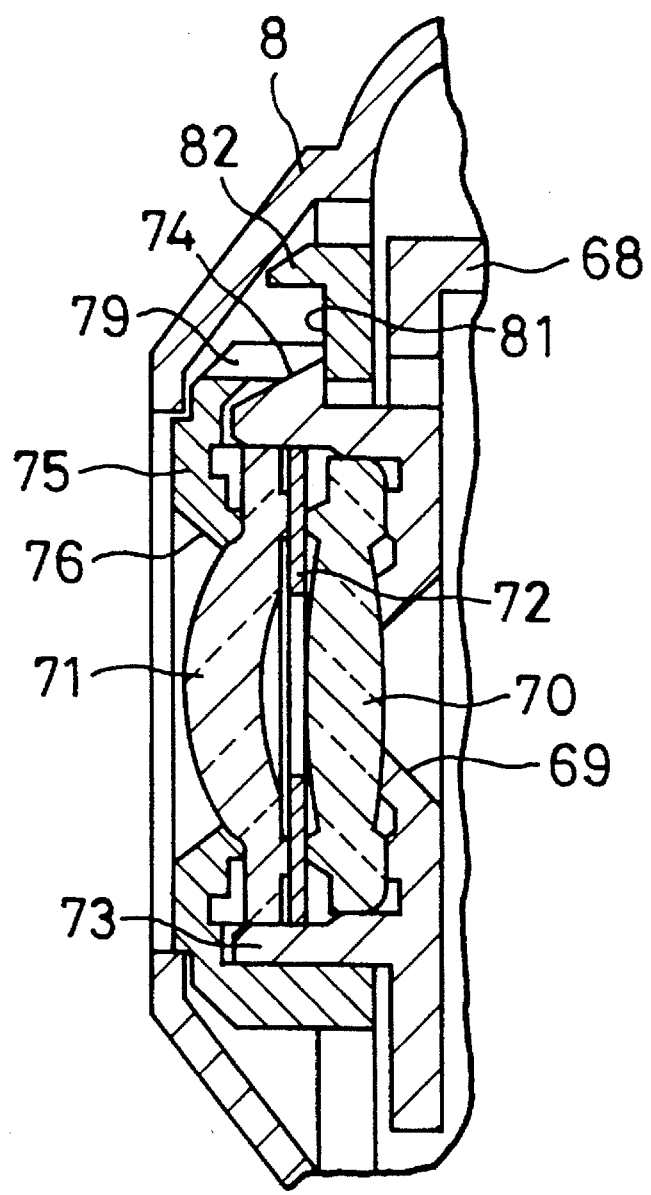
FIG. 9 is an enlarged fragmentary vertical section of the film package, illustrating the taking lens system in assembled position.
Figure 10:
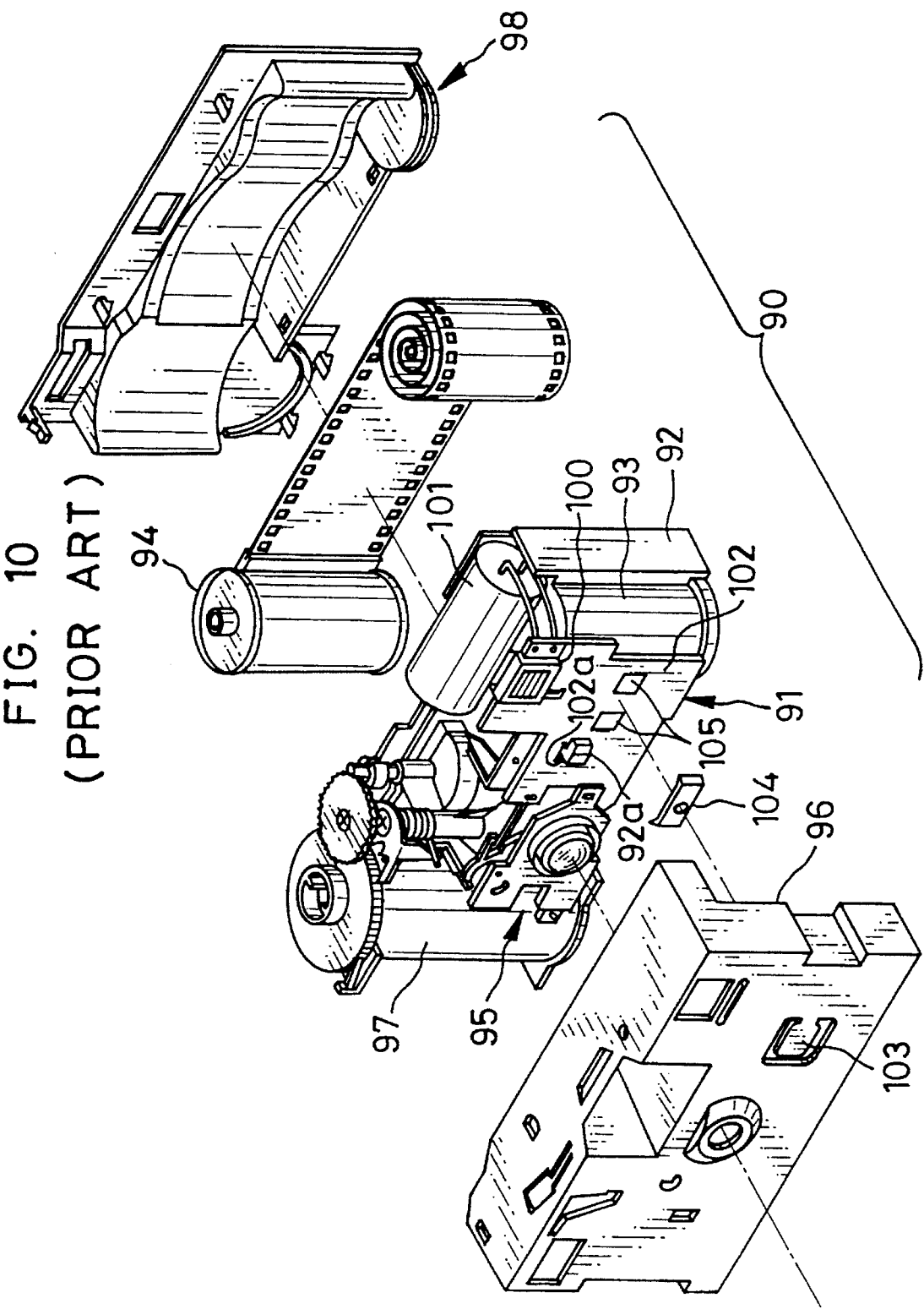
FIG. 10 is an exploded perspective view of a conventional film package.

The lens cover 75 is formed from a plastic material as one body, as shown in more detail in FIG. 8, which has a center opening 76' coaxial with the optical axis 15, and three engaging portions 77 engaged with the engaging claws 74 of the lens barrel 73. The engaging portions 77 are formed around the cylindrical peripheral surface of the lens cover 75 at the same intervals as the engaging claws 74. Each engaging portion 77 is comprised by an axial slot 78, a pair of axial arms 79 formed by providing two slots 80 on both sides of the slot 78, and a radial lug 81 connected to the tips of the arms 79. The arms 79 can be resiliently bent radially outwardly when the lens cover 75 is pressed onto the front of the lens holder 73 so as to fit the engaging claws 74 into the slots 78. Thereby, the lugs 81 are brought into engagement with the engaging claws 74, as is shown in greater detail in FIG. 9.

A pair of hooks 82 are formed on the radially outer edge of each lug 81. Thus, a robot hand or the like, for example, can approach the lens cover 75 in the direction of the optical axis 15 and push the hooks 82 in radially outward directions, thereby disengaging the lugs 81 from the engaging claws 74. Upon removing the robot hand from the lens holder 73 in this condition, the lens cover 75 will be removed from the lens holder 73, because the hooks 82 will still be engaged with the robot hand owing to the resiliency of the arms 79.

Instead of the engaging claws 74 and the engaging portions 77, it is possible to form engaging holes or slots in the peripheral surface of the lens holder 73 while forming corresponding engaging claws on the lens cover 75.

The operation of the above-structured embodiment will now be described. Upon rotating the film advancing wheel 5 to advance the photographic film 20 by an amount corresponding to one frame after having taken a photograph, the sprocket wheel 63 is rotated by the advance of the film 20 to cause the shutter cocking cam 64 to make one rotation. Thereby, the shutter actuating lever 66 is caused to be rotated clockwise (FIG. 5) due to contact with the cam 64. Thereby, the shutter actuating lever 66 is moved into the cocked position while the arresting lever 65 is slightly rotated into a locked position, wherein the shutter actuating lever 66 is locked in the cocked position and the film advancing wheel 5 is locked from rotating through engagement between a claw 65a of the arresting lever 65 and the teeth 5a of the film advancing wheel 5. Simultaneously, the frame counter disk 10 is advanced by one unit.

Upon depression of the shutter button 7, the shutter actuating lever 66 is disengaged from the arresting lever 65, and swings counterclockwise (FIG. 5) due to the strong force of the drive spring 67, until lever 66 strikes the end 52b of the shutter blade 52 with its arm 66a. Thereby, the shutter blade 52 is swung from the close position to the open position to permit light from an object to pass through the taking lenses 70, 71 and the stop aperture 69 and to fall on the photographic film 20 positioned in the exposure aperture 16b of the exposure chamber 16. The shutter blade 52 is swung back into the closed position by the force of the spring 76. Thereafter, the same operation as above is repeated to take subsequent photographs.

After the exposure of all available frames of the contained film 20, the film package 2 is forwarded to a photofinisher. The photofinisher removes the film cassette 19 containing the exposed film 20 from the film housing 3, to develop and print the exposed film 20. The obtained photoprints and the developed film 20 are returned to the customer.

The photofinisher collects empty film packages 2 in a container or the like, and forwards the container to the manufacturer. The manufacturer transports the containers to a factory having an automatic recycling system including a disassembling line and an assembling line. On the disassembling line, the empty film packages 2 are taken out of the container and fed to a first process where the outer casings 4 are removed from the film housings 3. In case the outer casings 4 are made of cardboard, the removed outer casings 4 may be recycled as scrap paper.

In a second process, the front covers 25 are disassembled from the film housing 53, and thereafter, the batteries 23 are removed from the flash units 22, and the meal contact blades 32 are removed from the cavities 18a of the main bodies 14. Because the front cover 25 has no attachment made of different material, the front covers 25 are smashed and melted into pellets. In a third process, the flash units 22 are removed to be sent to an inspection process. Those flash units 22 which pass the inspection are reused in new film packages.

In a fourth process, the photo-taking units 24 are removed. Because the taking lens elements 70 and 71 are securely held in the lens holder 73 by the lens cover 75, the removal of the photo-taking unit 24 can be easily performed while preventing the taking lens elements 70 and 71 from dropping out. Also, the eyepiece 55 and the objective lens 54 are pinched by the side walls 58a and 59a of the channels 58 and 59 of the viewfinder frame 53, so that these lenses 54 and 55 will not slip off the viewfinder frame 53 even when the photo-taking unit 24 is separated from the main body 14.

In the inspection process, the operations of the shutter mechanism and the film advance stop mechanism are tested, and the taking lens system 11 as well as the viewfinder optical system 54, 55 are inspected. In order to wash the lens elements 54, 55, 70 and 71 before the inspection or to replace them by new ones after the inspection, these lens elements may be removed from the photo-taking unit 24. Because of the resiliency of the side walls 58a and 59a, the eyepiece 55 and the objective lens 54 may be easily removed from the viewfinder frame 53 by pulling them up out of the channels 58 and 59. To remove the taking lens elements 70 and 71, a robot hand catches the lens cover 75 by the disengaging claws 82 and pushes the claws 82 in radially outward directions, to disengage the lens cover 75 from the lens holder 73.

After the inspected taking lens elements 70 and 71 are reset in the lens holder 73, or after new lens elements are set in the lens holder 73, the robot hand still holding the lens cover 75 is moved in the axial direction to fit the lens cover 75 onto the lens holder 73 while positioning the engaging portions 77 in accordance with the engaging claws 74 of the lens holder 73. Because the disengaging claws 82 are formed on the outer edges of the lugs 81, the robot hand does not damage the lens elements 70 and 71.

Those photo-taking units 24 which pass the inspection are reused in new film packages. Because the remaining main body 14 does not contain the film cassette 19, and the rear cover 21 still attached to the main body 14 is formed from the same plastic resin material as that of the main body 14, these parts 14 and 21 are directly sent to a resin material recovery process, to be melted into pellets.

On the assembling line, first a film advancing wheel 5 is mounted on a main body 14, and then a flash unit 22 and a photo-taking unit 24 which have been recovered from the used film packages and have passed inspection, are attached to the main body 14. After a metal contact blade 32 and a battery 23 are mounted in place, a front cover 25 is attached to the main body 14. Thereafter, a film cassette and a film roll are loaded from the rear side into the main body 14 in a dark room. Also, a rear cover 21 is secured to the main body 14 in the dark room, so as to complete a film housing 3 containing the film cassette and the film roll in a light-tight fashion. Finally, the film housing 3 is encased in an outer casing 4 to complete a new film package 2.

While the present invention has been described with respect to the preferred embodiment shown in the drawings, the present invention is not to be limited to the above-described embodiments, but on the contrary, various modifications may be possible without departing from the scope of the appended claims.

What is claimed is:

1. A lens-fitted photographic film package comprising:

a main body having a film take-up chamber containing a film cassette with a spool, a film supply chamber containing a roll of photographic film with an end of said film secured to said spool of said film cassette, and an exposure aperture disposed between said film take-up and supply chambers;

a rear cover covering said main body from the rear so as to shield said photographic film from external light;

a photograph-taking section disposed in front of said exposure aperture and including a taking lens system and a shutter mechanism;

a front cover covering said main body and said photograph-taking section front;

a lens holder incorporated in said photograph-taking section for receiving said taking lens system therein, said lens holder having a cylindrical peripheral surface surrounding a stop aperture and a plurality of engaging portions formed integrally with said peripheral surface;

a lens cover fitted on said lens holder through snap-in engagement between said engaging portions of said lens holder and resilient engaging portions formed integrally with said lens cover, to hold said taking lens system immovably in said lens holder; and wherein said lens cover further has hooks formed outside said lens cover integrally with said resilient engaging portions, said hooks being adapted to be used for bending said resilient engaging portions outwardly.

2. A lens-fitted photographic film package as recited in claim 1, wherein each of said resilient engaging portions comprises a pair of resilient axially extending arms, an axially extending slot formed between said arms, and a radially extending lug connected to tips of said arms, said hooks being formed on radially outer portions of said lugs, said engaging portions of said lens holder comprising claws engageable with said lugs when said claws are disposed in said slots.

3. A lens-fitted photographic film package comprising:

a main body having a film take-up chamber containing a film cassette with a spool, a film supply chamber containing a roll of photographic film with an end of said film secured to said spool of said film cassette, and an exposure aperture disposed between said film take-up and supply chambers;

a rear cover covering said main body from the rear so as to shield said photographic film from external light;

a photograph-taking unit having a taking lens system, a shutter mechanism and a film advance stop mechanism incorporated therein, said photograph-taking unit being removably attached to said main body in front of said exposure aperture;

a front cover covering said main body and said photograph-taking unit front; and a viewfinder optical system incorporated in and removable with said photograph-taking unit.

4. A lens-fitted photographic film package as recited in claim 3, wherein a lens frame for holding lens elements of said viewfinder optical system is integrally formed on an upper portion of a base frame of said photograph-taking unit, and front and rear windows for said viewfinder optical system are formed in said front and rear covers, respectively.

5. A lens-fitted photographic film package as recited in claim 4, wherein said front cover has a top wall portion for covering said main body and said photograph-taking unit from the top, and said lens frame has channels for slidably inserting lateral side edges of said lens elements from the top of said lens frame.

6. A lens-fitted photographic film package as recited in claim 5, wherein said front cover has a pair of ribs formed inside a top wall portion of said front cover, for holding at least one of said lens elements down in said lens frame.

7. A lens-fitted photographic film package as recited in claim 5, wherein said channels open toward each other, each said channel having side walls that converge toward the other channel, said side walls being resiliently bendable away from each other to pinch said lens elements between said side walls.

8. A lens-fitted photographic film package as recited in claim 5, wherein a lens holder is incorporated in said photograph-taking unit for receiving said taking lens system therein, said lens holder having a cylindrical peripheral surface surrounding a stop aperture and a plurality of engaging portions formed integrally with said peripheral surface, and a lens cover fitted on said lens holder through snap-in engagement between said engaging portions of said lens holder and resilient engaging portions formed integrally with said lens cover, to hold said taking lens system immovably in said lens holder.

* * * * *